(12) United States Patent
Geers (10) Patent No.: US 7,352,794 B2
(45) Date of Patent: Apr. 1, 2008

(54) METHOD AND ARRANGEMENT FOR USE IN A SINGLE USER DETECTOR FOR A CDMA MULTI-PATH SYSTEM

(75) Inventor: Steven Nicholas Geers, Tetbury (GB)

(73) Assignee: IP Wireless Inc., San Bruno, CA (US)

( * ) Notice: Subject to any disclaimer, the term of this patent is extended or adjusted under 35 U.S.C. 154(b) by 610 days.

(21) Appl. No.: 10/262,160

(22) Filed: Oct. 1, 2002

(65) Prior Publication Data

US 2003/0095586 A1   May 22, 2003

(30) Foreign Application Priority Data

Oct. 1, 2001   (GB)   ................................. 0123520.9

(51) Int. Cl.
*H04B 1/00* (2006.01)
*H04B 1/10* (2006.01)
*H04B 7/10* (2006.01)

(52) U.S. Cl. ....................... 375/142; 375/347; 375/350

(58) Field of Classification Search ................ 375/142, 375/147, 229–230, 232, 267, 347, 350, 233; 455/213, 307, 339

See application file for complete search history.

(56) References Cited

U.S. PATENT DOCUMENTS

| | | | | |
|---|---|---|---|---|
| 5,717,619 A | * | 2/1998 | Spurbeck et al. | ........... 708/319 |
| 6,078,573 A | | 6/2000 | Batalama et al. | |
| 6,314,147 B1 | * | 11/2001 | Liang et al. | ................. 375/346 |
| 6,377,611 B1 | * | 4/2002 | Hwang | ........................ 375/140 |
| 6,411,976 B1 | * | 6/2002 | Cesari et al. | ................ 708/319 |
| 6,459,334 B2 | * | 10/2002 | Wright et al. | ................... 330/2 |
| 6,466,611 B1 | * | 10/2002 | Bachu et al. | ................ 375/144 |
| 6,826,226 B1 | * | 11/2004 | Sahlin et al. | ................ 375/232 |
| 6,870,882 B1 | * | 3/2005 | Al-Dhahir et al. | .......... 375/233 |
| 6,999,509 B2 | * | 2/2006 | Awad et al. | ................. 375/232 |
| 7,027,536 B1 | * | 4/2006 | Al-Dhahir | .................... 375/347 |
| 7,079,607 B2 | * | 7/2006 | Brunel | ........................ 375/346 |
| 2004/0047400 A1 | * | 3/2004 | Iinatti et al. | ................. 375/143 |

FOREIGN PATENT DOCUMENTS

| | | |
|---|---|---|
| EP | 0926913 A2 | 6/1999 |
| WO | WO-01/22610 A1 | 3/2001 |

OTHER PUBLICATIONS

Pados et. al., "Auxiliary-Vector Filters and Adaptive Steering for DS-CDMA Single-User Detection", IEEE 1999.*

(Continued)

*Primary Examiner*—Mohammed Ghayour
*Assistant Examiner*—Sophia Vlahos
(74) *Attorney, Agent, or Firm*—Morrison & Foerster LLP (57) ABSTRACT

A method and arrangement for use in a single user detector in a CDMA multi-path system, comprising providing a finite impulse response (FIR) filter; and configuring the FIR filter to derive at least a first, then a second, then a third, then a fourth of the following parameters for single user detection: R (auto-correlation) function; L (Cholesky decomposition) value; X value representative of the complex conjugate of a channel impulse response multiplied and summed with time shifted versions of a received signal; back substitution value Y (function of R, X and L); and back substitution value S (function of R, X, Y and L).

16 Claims, 9 Drawing Sheets

OTHER PUBLICATIONS

Great Britain Search Report mailed May 13, 2001, for Great Britain Application No. 0123520.9 filed Oct. 1, 2001, 1 page.

Klein et al. (1996). "Zero Forcing and Minimum Mean-Square-Error Equalization for Multiuser Detection in Code-Division Multiple-Access Channels," IEEE Transactions on Vehicular Technology, 45(2):276-287.

Frederikos et al. (1999). "A Parallel Fractional Adaptive Single-User Receiver for Asynchronous CDMA Systems," IEEE Transactions on Vehicular Technology, pp. 588-592.

International Search Report mailed on Apr. 29, 2003 for PCT Application No. PCT/GB02/04414 filed on Oct. 01, 2002, one page.

* cited by examiner

FIG. 1

(PRIOR ART)

(PRIOR ART)

FIG. 4

(PRIOR ART)

METHOD AND ARRANGEMENT FOR USE IN A SINGLE USER DETECTOR FOR A CDMA MULTI-PATH SYSTEM

FIELD OF THE INVENTION

This invention relates to code division multiple access (CDMA) multi-path systems, and particularly to Single User Detectors for use in such systems.

BACKGROUND OF THE INVENTION

In the field of this invention it is known that Single User detection is a method of applying signal processing to a received CDMA input signal to improve the signal quality before the CDMA signal is despread. A Single User detector typically consists of a channel equalizer to exploit the multipath diversity and a code matched filter which is matched to the spreading and scrambling codes of the codes to be despread. A Single User detector exploits the fact that all the codes originate from the same transmitter and so the codes will all be convolved by the same channel impulse response.

The idea behind this approach is to equalize the multipath channel such that the received CDMA codes are forced into orthogonality. The algorithm used is based on the Minimum Mean Squared Error (MMSE) criterion. This algorithm comprises the calculation of several parameters (commonly referred to as R, L, X, Y, and S values) which typically involves considerable complexity and compromises for the sake of efficiency.

A need therefore exists for a method and arrangement for a single user detector for use in a CDMA multi-path system wherein the above-mentioned disadvantage(s) may be alleviated.

STATEMENT OF INVENTION

In accordance with a first aspect of the present invention there is provided a method for use in a single user detector in a CDMA multi-path system, comprising:
 providing a finite impulse response (FIR) filter; and
 configuring the FIR filter to derive at least a first, then a second, of the following parameters for single user detection:
R (auto-correlation) function,
X value,
Y value, and
S value.

In accordance with a second aspect of the present invention there is provided an arrangement for use in a single user detector in a CDMA multi-path system, comprising:
 a finite impulse response (FIR) filter; and
 means for configuring the FIR filter to derive at least a first, then a second, of the following parameters for single user detection:
auto-correlation (R) function,
X value,
Y value, and
S value.

Such an arrangement may be comprised in a single user detector for use in a CDMA multi-path system.

Such an arrangement may be comprised in user equipment for use in a universal mobile telecommunications system (UMTS) system.

Such an arrangement may be comprised in a base station for use in a UMTS system.

BRIEF DESCRIPTION OF THE DRAWINGS

One method and arrangement for a single user detector, based on calculation of R, L, X, Y, S parameters (functions and values), for use in a CDMA multi-path system incorporating the present invention will now be described, by way of example only, with reference to the accompanying drawings, in which.

DESCRIPTION OF PREFERRED EMBODIMENT

Single User detection is a method of applying signal processing to a received CDMA input signal to improve the signal quality before the CDMA signal is despread. A Single User detector consists of a channel equalizer to exploit the multipath diversity and a code matched filter which is matched to the spreading and scrambling codes of the codes to be despread. A Single user detector exploits the fact that all the codes originate from the same transmitter and so will all be convolved by the same channel impulse response.

Figure 1:
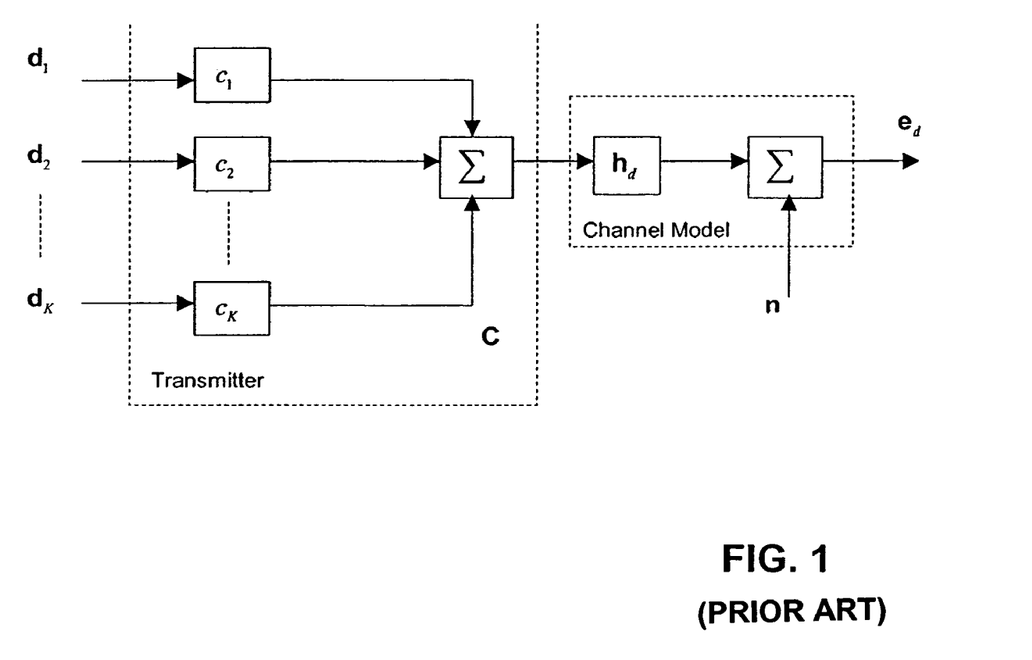
FIG. 1 shows a schematic diagram of a channel model for single user detection.

FIG. 1 illustrates that in a CDMA transmission the data $d_1 \ldots d_K$ for each of k user codes is spread by the user spreading codes $c_1 \ldots c_K$ and then summed in the transmitter. The channel model is depicted by putting the transmitted data through the channel impulse response $h_d$, and then by adding Gaussian noise n to give the data that is received at the joint detector $e_d$.

Figure 2:
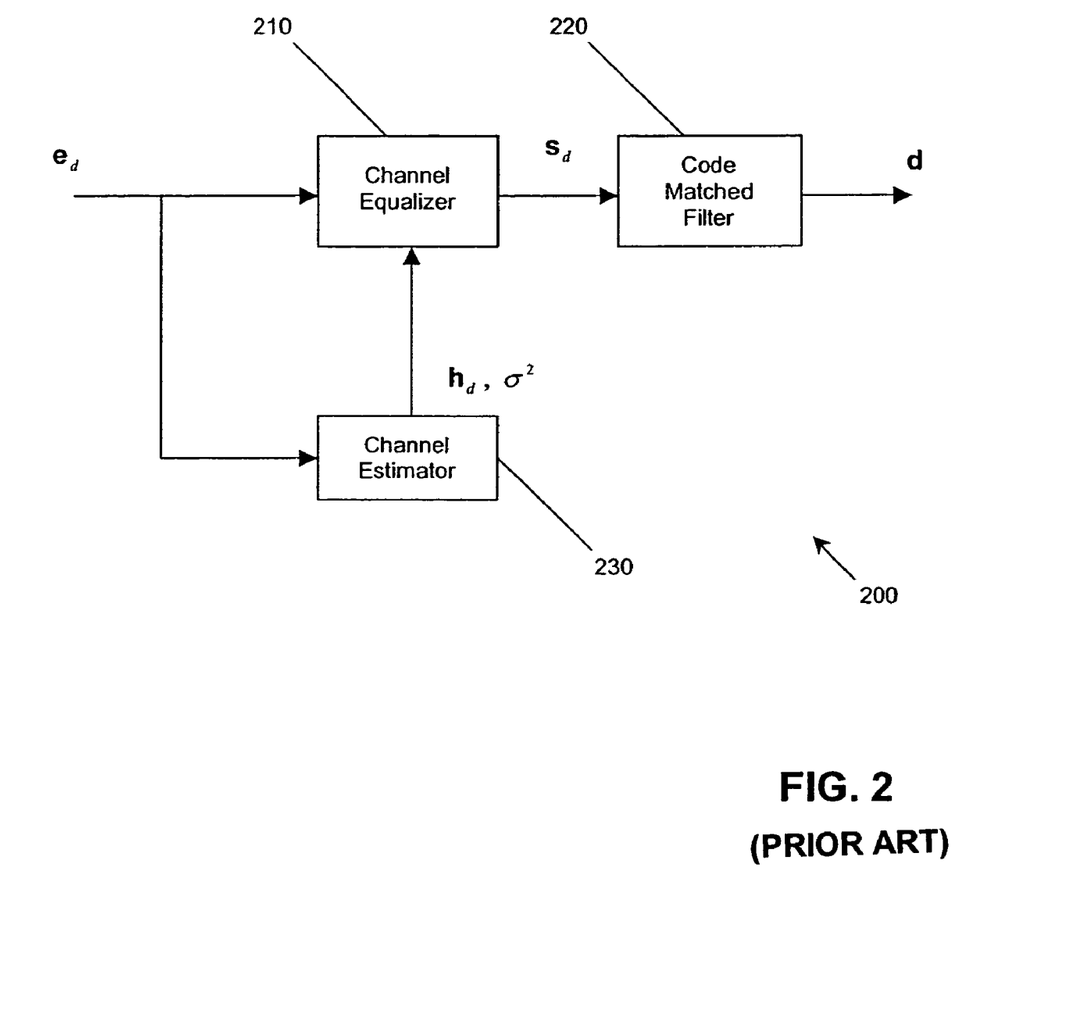
FIG. 2 shows a block-schematic diagram of a single user detector.

As represented schematically in FIG. 2, a Single User detector 200 can be partitioned into three separate blocks: a channel equalizer 210, a code matched filter 220 and a channel estimator 230. The idea behind this approach is to equalize the multipath channel such that the received CDMA codes are forced into orthogonality. The algorithm used in such a detector is based on the Minimum Mean Squared Error (MMSE) criterion, such that the estimate of the MMSE block linear equalizer can be described by the following equation:

$$\hat{d} = \frac{1}{Q} C_d^{*T} (H_d^{*T} H_d + \alpha \sigma^2 I)^{-1} H_d^{*T} e_d$$

where
I is the identity matrix
$H_d$ contains the channel impulse response, $h_d$
$\sigma^2$ is the noise variance Q is the spreading factor
$C_d$ is the spreading code matrix
α is a suitable scaling factor
$e_d$ is the received data
$\hat{d}$ is the equalized despread output data
$\hat{s}$ is equalized data before despreading.

The output of the block linear equalizer can be written as $$s_d = (H_d^{*T}H_d + \alpha\sigma^2 I)^{-1} H_d^{*T} e_d$$

which can be rewritten as $$(H_d^{*T}H_d + \alpha\sigma^2 I) s_d = H_d^{*T} e_d.$$

The left hand side of the above equation can be factorised by performing a Cholesky decomposition, which can be written as $$Ly = X \quad (A)$$

$$L^{*T} s_d = y \quad (B)$$

where $X = H_d^{*T} e_d$
and L is a lower triangular matrix of the form $$L = \begin{pmatrix} l_{11} & 0 & \cdots & 0 \\ l_{21} & l_{22} & 0 & 0 \\ \vdots & \vdots & \ddots & 0 \\ l_{n1} & l_{n2} & \cdots & l_{nn} \end{pmatrix}$$

and $(H_d^{*T}H_d + \alpha\sigma^2 I) = LL^{*T}$. In the process of data estimation, the above equations are first solved for y and then solved for $s_d$. In both cases, factorisation means that back substitution can be employed. Once $s_d$ has been determined, it is straightforward to obtain an estimate of the data using $$\hat{d} = \frac{1}{Q} C_d^T s_d.$$

The first step in the algorithm is to perform the Cholesky decomposition. Since $(H_d^{*T}H_d + \alpha\sigma^2 I)$ is block Toeplitz in structure, and N (the order of the matrix) is quite large (>69), the elements of the matrix L converge quickly, consequently, it is only necessary to compute the first W block rows of the matrix L, where W is the length of the channel impulse response used in the Single User Detector.

Firstly, the first W×W elements of the matrix $(H_d^{*T}H_d + \alpha\sigma^2 I)$ are computed. This is a simple procedure, as it is only necessary to compute the auto-correlation function of the channel estimate, and then fill in the appropriate elements of the matrix. The auto-correlation function is given by $$R_u = \sum_{k=1}^{W-u+1} h_k h_{k+u-1}^* \text{ for } u = 1 \ldots W$$

and the W×W elements of the matrix $(H_d^{*T}H_d)$ are given by $$(H_d^{*T}H_d) = \begin{pmatrix} R_1 & R_2 & R_3 & \cdots & R_W \\ R_2^* & R_1 & R_2 & R_3 & \cdots \\ R_3^* & R_2^* & R_1 & R_2 & R_3 \\ \vdots & R_3^* & R_2^* & R_1 & R_2 \\ R_W^* & \vdots & \vdots & R_2^* & \ddots \end{pmatrix}$$

In forming the elements of the matrix L it is only necessary to consider the lower triangular portion of the above matrix; in fact, by careful inspection it is found that only the first column of the above matrix is required, giving $$(H_d^{*T}H_d)' = \begin{pmatrix} R_1 & 0 & 0 & 0 \\ R_2 & R_1 & 0 & 0 \\ R_3 & R_2 & R_1 & 0 \\ R_W & R_3 & R_2 & R_1 \end{pmatrix}.$$

Then for $i=1 \ldots W$, $j=(i+1) \ldots W$, and $l_{11}=\sqrt{R_1}$; $i=j=1$, the elements of the matrix L up to the $i^{th}$ column are given by the recursive relationships:

$$l_{ji} = \frac{R_j^*}{l_{11}}; i = 1, j = 2 \ldots W$$

$$l_{ii} = \sqrt{\left(R_1 - \sum_{k=1}^{i-1} |l_{ik}|^2\right)}; i > 1$$

$$l_{ij} = \left(R_{j-(i-1)}^* - \sum_{k=1}^{i-1} l_{jk} l_{ik}^*\right) \bigg/ l_{ii}; i > 1, j \neq i$$

which results in the sub-matrix $$\begin{pmatrix} l_{11} & 0 & \cdots & 0 \\ l_{21} & l_{22} & 0 & 0 \\ \vdots & \vdots & \ddots & 0 \\ l_{n1} & l_{n2} & \cdots & l_{nn} \end{pmatrix}.$$

The complete NQ×NQ L matrix is constructed by taking the $W^{th}$ row of the above sub-matrix, and inserting it row-wise at column positions given by i−W, where i is the current column position. In fact, when estimating the data, the complete L matrix need never be constructed. To solve for $y_j$ using eqn. (A), the following equations are used:

$$y_1 = \frac{x_1}{l_{11}}$$

$$y_2 = (x_2 - y_1 l_{21})/l_{22}$$

$$y_3 = (x_3 - [y_1 l_{31} + y_2 l_{32}])/l_{33}$$

$$y_4 = (x_4 - [y_1 l_{41} + y_2 l_{42} + y_3 l_{43}])/l_{44}$$

$$y_5 = (x_5 - [y_2 l_{41} + y_3 l_{42} + y_4 l_{43}])/l_{44}$$

$$y_6 = (x_6 - [y_3 l_{41} + y_4 l_{42} + y_5 l_{43}])/l_{44}$$

$$y_j = (x_j - [y_{j-3} l_{41} + y_{j-2} l_{42} + y_{j-1} l_{43}])/l_{44}$$

where $$x_j = h_d^{*T} e_{d_j}, j=1 \ldots NQ \qquad (C)$$

and $$e_{d_j} = (e_{d_j+1}, e_{d_j+2}, \ldots, e_{d_j+W})^T.$$

From the above, it can be observed that when $j \geq W$, back substitution can be generalised for any W or NQ, such that $$y_j = \left(x_j - \sum_{i=1}^{W_f-1} l_{Wi} y_{j(W-i)}\right) / l_{WW}.$$

It is apparent that the second term in the brackets of this equation can be considered as an FIR filter function with coefficients given by $l_{Wi}$, over a span of W−1 chip periods. To determine the output of the channel equalizer, $s_d$, eqn (B) is used, but the form of $L^{*T}$ is now upper triangular. This means that the order of processing has to be reversed. Again, the set of equations is written out, starting from the bottom up, as follows $$s_{NQ} = \frac{y_{NQ}}{l_{44}}$$

$$s_{NQ-1} = (y_{NQ-1} - s_{NQ} l_{43}^*)/l_{44}$$

$$s_{NQ-2} = (y_{NQ-2} - [s_{NQ-1} l_{43}^* + s_{NQ} l_{42}^*])/l_{44}$$

$$s_{NQ-3} = (y_{NQ-3} - [s_{NQ-2} l_{43}^* + s_{NQ-1} l_{42}^* + s_{NQ} l_{41}^*])/l_{44}$$

$$s_{NQ-4} = (y_{NQ-4} - [s_{NQ-3} l_{43}^* + s_{NQ-2} l_{42}^* + s_{NQ-1} l_{41}^*])/l_{44}$$

$$s_{NQ-5} = (y_{NQ-5} - [s_{NQ-4} l_{43}^* + s_{NQ-3} l_{42}^* + s_{NQ-2} l_{41}^*])/l_{44}$$

$$s_{NQ-(j-1)} = (y_{NQ-(j-1)} - [s_{NQ-(j-2)} l_{43}^* + s_{NQ-(j-3)} l_{42}^* + y_{NQ-(j-4)} l_{41}^*])/l_{44}$$

Here $j=(1 \ldots NQ-W+1)$, and again a generalisation can be made for $W \leq j \leq NQ-W+1$, such that $$s_{NQ-(j-1)} = \left(y_{NQ-(j-1)} - \sum_{i=1}^{W_f-1} l_{W_f i}^* s_{NQ-(j-(i+1))}\right) / l_{W_f W_f}$$

where the second term in the brackets can be considered as an FIR filter function with coefficients given by $l^*_{Wi}$, over a span over W−1 chip periods. For $j > NQ-W+1$, the W−1 values of the vector $s_d$ are computed using the modified $L^{*T}$ matrix with back substitution. This is generalised, such that $$L^{*T} = \begin{pmatrix} l_{11} & l_{21}^* & l_{31}^* & \cdots & l_{W_f 1}^* & 0 & 0 & \cdots & 0 \\ 0 & l_{22} & l_{32}^* & \cdots & l_{W_f 2}^* & l_{W_f 1}^* & 0 & \cdots & 0 \\ 0 & 0 & \ddots & \ddots & \vdots & l_{W_f 2}^* & \ddots & \ddots & \vdots \\ 0 & 0 & 0 & \ddots & \vdots & \vdots & \ddots & \ddots & 0 \\ 0 & 0 & 0 & 0 & l_{W_f W_f} & l_{W_f(W_f-1)}^* & \cdots & l_{W_f 2}^* & l_{W_f 1}^* \end{pmatrix}$$

For $W_f=4$ and NQ=1104, this gives the set of equations:

$$s_4 = (y_4 - [l_{43}^* s_5 + l_{42}^* s_6 + l_{41}^* s_7])/l_{44}$$

$$s_3 = (y_3 - [l_{43}^* s_4 + l_{42}^* s_5 + l_{41}^* s_6])/l_{33}$$

$$s_2 = (y_2 - [l_{32}^* s_3 + l_{42}^* s_4 + l_{41}^* s_5])/l_{22}$$

$$s_1 = (y_1 - [l_{21}^* s_2 + l_{31}^* s_3 + l_{41}^* s_4])/l_{11}$$

Figure 3:
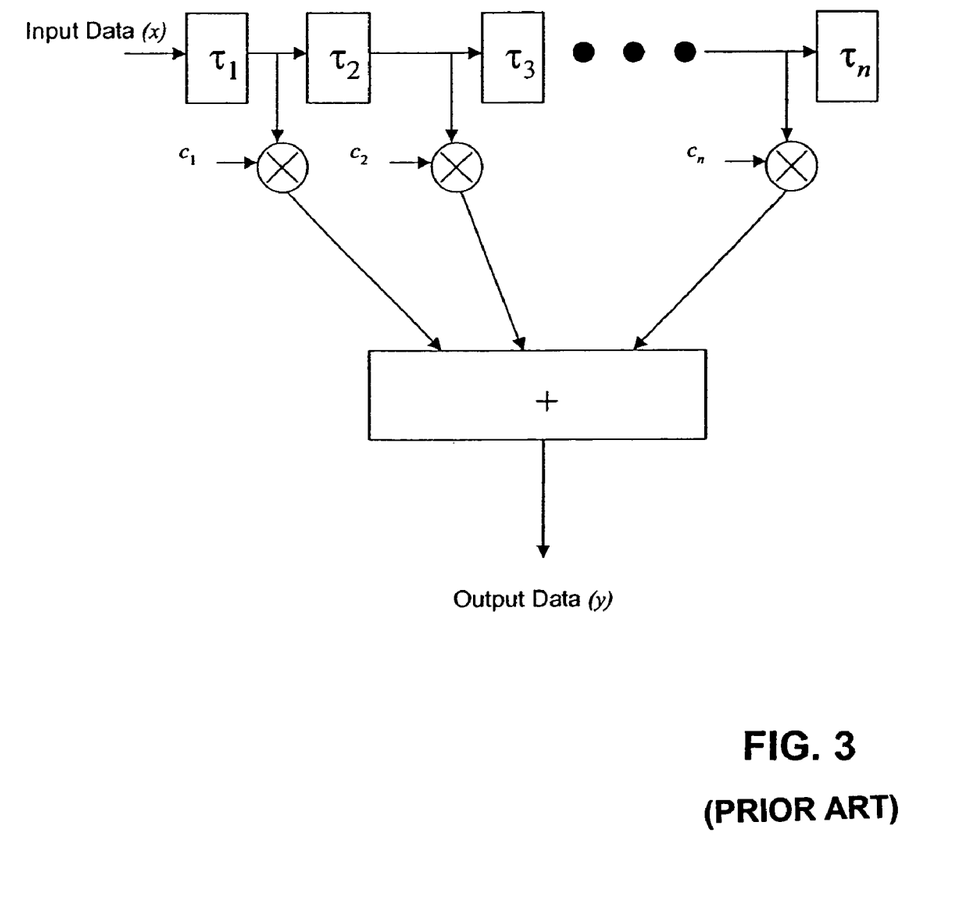
FIG. 3 shows a block-schematic diagram of a standard FIR filter structure.

Referring now also to FIG. 3, an FIR filter can be implemented as a delay pipe for the input data where each delayed element is multiplied by the filter tap coefficient before summing the results. It will be understood that as depicted in this figure, n is the number of filter taps, τ represents a delay element, and $c_1 \ldots c_n$ are the filter tap coefficients.

Here $$y_1 = x_1 * c_1$$

$$y_2 = x_1 * c_2 + x_2 * c_1$$

$$y_3 = x_1 * c_3 + x_2 * c_2 + x_3 * c_1$$

$$y_j = \sum_{p=1}^{n} x_{p+j-n} * c_{n-p+1} \text{ for } j >= n$$

Figure 4:
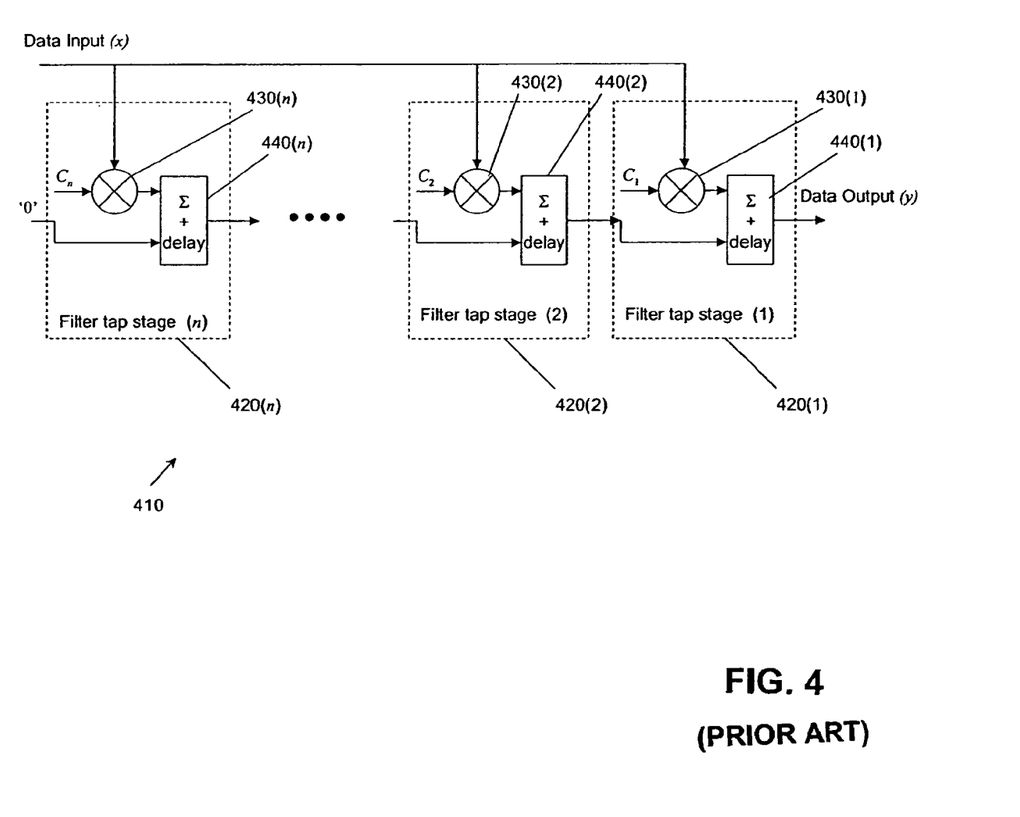
FIG. 4 shows a block-schematic diagram of an Inverse Filter Structure.

As shown in FIG. 4, an inverse FIR filter 410 has n filter tap stages 420(1), 420(2) ... 420(n). Each of the filter tap stages has a multiplier 430 and a summation and delay element 440. The outputs of the summation and delay elements are respectively coupled to the inputs of summation and delay elements to immediately to their right. Examination of the inverse filter structure illustrated in FIG. 4 reveals that this structure is equivalent to the standard FIR filter structure.

For example,
Let n=4 giving a 4 tap filter
When $x_1$ is input to the filter, the values into each of the 4 delay elements from left to right are
$X_1 * C_4$, $X_1 * C_3$, $X_1 * C_2$, $X_1 * C_1$, and the output taken from the right hand side is $X_1 * C_1$.
When $x_2$ is input to the filter, the values into each of the 4 delay elements from left to right are
$X_2 * C_4$, $X_1 * C_4 + X_2 * C_3$, $X_1 * C_3 + X_2 * C_2$, $X_1 * C_2 + X_2 * C_1$, and the output taken from the right hand side is
$X_1 * C_2 + X_2 * C_1$.
When $x_3$ is input to the filter the values into each of the 4 delay elements from left to right are
$X_3 * C_4$, $X_2 * C_4 + X_3 * C_3$, $X_1 * C_4 + X_2 * C_3 + X_3 * C_2$, $X_1 * C_3 + X_2 * C_2 + X_3 * C_1$, and the output taken from the right hand side is
$X_1 * C_3 + X_2 * C_2 + X_3 * C_1$.
When $x_4$ is input to the filter the values into each of the 4 delay elements from left to right are
$X_4 * C_4$, $X_3 * C_4 + X_4 * C_3$, $X_2 * C_4 + X_3 * C_3 + X_4 * C_2$, $X_1 * C_4 + X_2 * C_3 + X_3 * C_2 + X_4 * C_1$, and the output taken from the right hand side is
$X_1 * C_4 + X_2 * C_3 + X_3 * C_2 + X_4 * C_1$.
Thus, it will be understood, this is the same output as for the standard FIR filter structure.

The inventor of the present invention has realised, through examination of the steps required to implement the joint detection process, that there are a number of similarities which allow reuse of a common FIR filter structure. It can be shown that by using a single FIR filter structure with W taps it is possible to implement the auto correlation function (R), the Cholesky decomposition L, the X value calculation and to solve the Y and S matrixes. This is accomplished by modifying the filter structure and the way that the filter coefficients are applied to the filter.

The five different filter configurations are:
Auto-correlation (R),
Cholesky decomposition L,
X value calculation,
Y back substitution, and
S back substitution.

Figure 5:
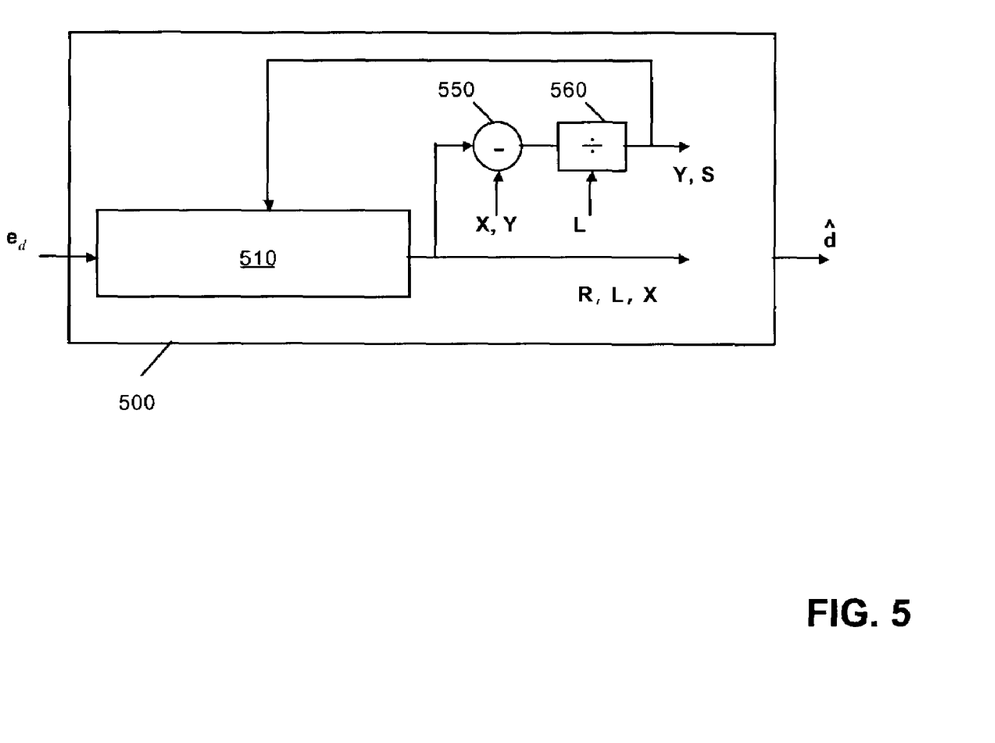
FIG. 5 shows a block-schematic diagram of a single user detector in accordance with the invention.

FIG. 5 shows a single user detector 500 incorporating a single inverse filter 510 for receiving input data and for producing the desired output values R, L, X, Y and S for use in the single detection process to recover the single user data d. As will be explained in greater detail below, in the FIR filter 510, the filter tap coefficients of its different stages and the connection paths of delay elements in the different stages may be configured as desired. As will also be explained in greater detail below, the single user detector 500 also includes a substractor 550 and a divider 560 for use in a particular configuration of the filter to derive the Y value for use in single user detection.

Auto-Correlation Function (R)

The autocorrelation function is given by $$R_u = \sum_{k=1}^{W-u+1} h_k h_{k+u-1}^*$$

Which can be expanded to $R_1 = h_1 * h_1^* + \ldots + h_W * h_W^*$ $R_{W-2} = h_1 * h_{W-2}^* + h_2 * h_{W-1}^* + h_3 * h_W^*$ $R_{W-1} = h_1 * h_{W-1}^* + h_2 * h_W^*$ $R_W = h_1 * h_W^*$ It can be seen from the above expansion that the auto-correlation function is a FIR filter of length W where the coefficients of the filter are given by $h_1^*, h_2^*, \ldots h_{W-1}^*, h_W^*$ which is the complex conjugate of the channel impulse response, and the input data is given by $h_1, h_2, \ldots h_w$ which is the channel impulse response time reversed. The W outputs are the auto-correlation sequence, time reversed.

The auto-correlation function is performed in this manner so that the same filter taps can be used to calculate the X vector, as will be explained in more detail below.

Cholesky Decomposition L

Cholesky decomposition is concerned with solving the equations given below:

$l_{11} = \sqrt{R_1}$; i=j=1, the elements of the matrix L up to the $i^{th}$ column are given by the recursive relationships:

$$l_{ji} = \frac{R_j^*}{l_{11}}; i = 1, j = 2 \ldots W \quad (D)$$

-continued $$l_{ii} = \sqrt{\left(R_1 - \sum_{k=1}^{i-1} |l_{ik}|^2\right)}; i > 1 \quad (E)$$

$$l_{ji} = \left(R_{j-(i-1)}^* - \sum_{k=1}^{i-1} l_{jk} l_{ik}^*\right) / l_{ii}; i > 1, j \neq i \quad (F)$$

which results in the following sub-matrix $$\begin{pmatrix} l_{11} & 0 & \cdots & 0 \\ l_{21} & l_{22} & 0 & 0 \\ \vdots & \vdots & \ddots & 0 \\ l_{n1} & l_{n2} & \cdots & l_{nn} \end{pmatrix}.$$

This is a recursive algorithm where the matrix values are calculated a column at a time from left to right. j are the row indexes and i are the column indexes. The diagonal value $l_{ii}$ cannot be calculated until the l values in the same row have been calculated.

Investigation of equation (F) above shows that for each column of $L_{ji}$ values (i.e., for a particular i value) and for each term (k) in the summation, the $l_{ik}^*$ value is the same.

Figure 6:
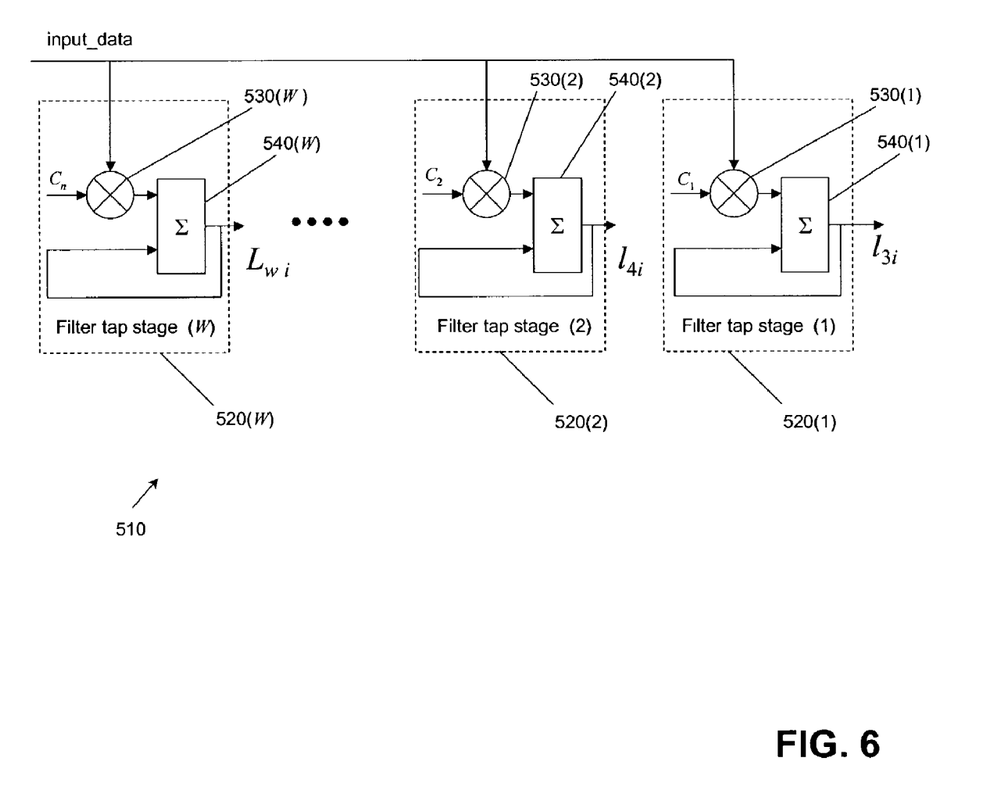
FIG. 6 shows a block-schematic diagram of the Inverse Filter structure of FIG. 5 as used for L value calculation.

Referring now to FIG. 6, the inverse filter structure can be modified by disconnecting the delay elements from each other and connecting each delay element back to its input, thus implementing an accumulator. As shown in the figure, in each of the W filter tap stages (520 (1) 520 (2) . . . 520 (W)) of the FIR 510 the summation and delay element (540 (1), 540 (2) . . . 540 (W)) has its output configured to feed back to its own input. The outputs from the w delay elements are now the L value for one column in the L matrix. The number of accumulations required before the L value is calculated is the number of terms in the summation of equation (F). As the column number of the L values being calculated increases, the number of accumulations required increases.

For example:

W=5

The first column i=1 is calculated first and does not use the structure above since there is no summation term in equation (D).

For i=2

The expanded summation from equation (F) is given by $l_{32} = (R_2^* - l_{31} * l_{21}^*) / l_{22}$ $l_{42} = (R_3^* - l_{41} * l_{21}^*) / l_{22}$ $l_{52} = (R_4^* - l_{51} * l_{21}^*) / l_{22}$ so the input_data in FIG. 6 is loaded with $l_{21}^*$ and the coefficients are $c_1 = l_{31}$ $c_2 = l_{41}$ $c_3 = l_{51}$ For i=3

The expanded summation from equation (F) is given by $l_{43} = (R_2^* - [l_{41} * l_{31}^* + l_{42} * l_{32}^*]) / l_{33}$ $l_{53} = (R_3^* - [l_{51} * l_{31}^* + l_{52} * l_{32}^*]) / l_{33}$ so the input_data in FIG. 6 is loaded with $l_{31}^*$ and the coefficients are $c_1=0$ $c_2=l_{41}$ $c_3=l_{51}$ Then the input_data in FIG. 6 is loaded with $l_{32}^*$ and the coefficients are $c_1=0$ $c_2=l_{42}$ $c_3=l_{52}$ These results are added to the previous outputs giving the summation results.

For i=4

The expanded summation from equation (F) is given by $l_{54}=(R_2^*-[l_{51}^*l_{41}^*+l_{52}^*l_{42}^*+l_{53}^*l_{43}^*])/l_{44}$ so the input_data in FIG. 5 is loaded with $l_{41}^*$ and the coefficients are $c_1=0$ $c_2=0$ $c_3=l_{51}$ Then the input_data in FIG. 6 is loaded with $l_{42}^*$ and the coefficients are $c_1=0$ $c_2=0$ $c_3=l_{52}$ These results are added to the previous outputs giving the summation results.

Then the input_data in FIG. 6 is loaded with $l_{43}^*$ and the coefficients are $c_1=0$ $c_2=0$ $c_3=l_{53}$ These results are added to the previous outputs giving the summation results.

Extra processing is required to take the summation output and subtract it from the $R^*$ value and divided it by the $L_{ii}$ value.

It will be understood that in the above procedure for generating outputs from the structure shown in FIG. 6, as the value of i increases from 1 to W, if the i value for a given $I_{ji}$ does not exist in the L matrix, then that output from the structure is not used.

X Value Calculation

Equation (C) above gives $x_j = h_d^{*T} e_{d_j}; j=1 \ldots NQ$

This is the complex conjugate of the channel Impulse response multiplied and summed with time shifted versions of the input data over the length of the input data.

Re writing this equation gives:

$$x_j = \sum_{n=1}^{w} h_n^* * e_{n+j-1} \quad j = 1 \ldots NQ$$

As referred to above, it can be shown that if the filter structure used in producing the auto-correlation function described above is loaded with the same coefficients as to produce the auto-correlation function, but the $e_d$ vector is inputted as data, then the j outputs after the first W−1 outputs have been ignored is $x_j$.

This allows calculation of the X values using the same filter structure as the R vectors with the same filter coefficients.

Y Back Substitution

Examination of the following Y equations $$y_1 = \frac{x_1}{l_{11}}$$

Figure 7:
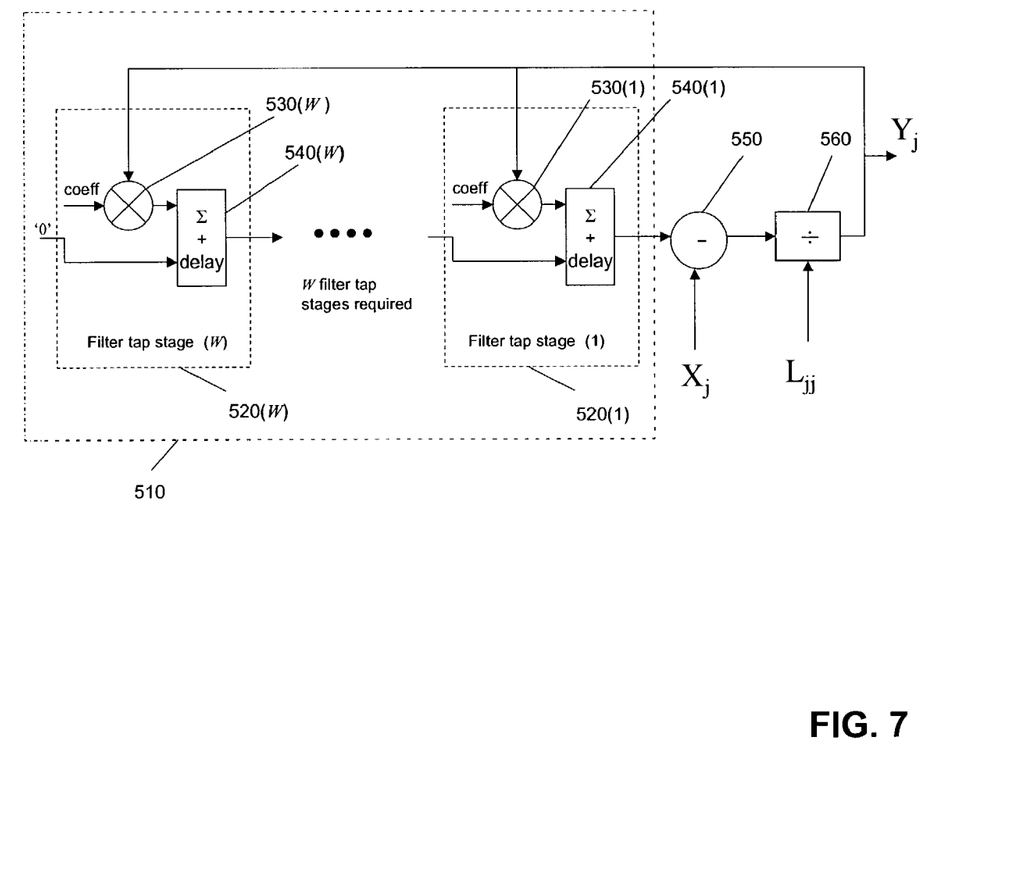
FIG. 7 shows a block-schematic diagram illustrating the Inverse Filter structure of FIG. 5 as used for Y value calculation.

$y_2=(x_2-y_1 l_{21})/l_{22}$ $y_3=(x_3-[y_1 l_{31}+y_2 l_{32}])/l_{33}$ $y_4=(x_4-[y_1 l_{41}+y_2 l_{42}+y_3 l_{43}])/l_{44}$ $y_5=(x_5-[y_2 l_{41}+y_3 l_{42}+y_4 l_{43}])/l_{44}$ $y_6=(x_6-[y_3 l_{41}+y_4 l_{42}+y_5 l_{43}])/l_{44}$ $y_j=(x_j-[y_{j-3} l_{41}+y_{j-2} l_{42}+y_{j-1} l_{43}])/l_{44}$ shows that to solve the y vector requires a FIR filter structure of W−1 taps with a feedback loop. This is shown in FIG. 7.

As shown in the figure, in this configuration the FIR 510 uses W filter tap stages (520 (W) ... 520 (1)), and the outputs of the stages' summation and delay elements 540 (W) ... 540 (1) are respectively connected to the input of the summation and delay elements in the adjacent stage to the right. Additionally, for deriving the Y value a subtractor 550 and a divider 560 are provided. The filter coefficients are changed for each iteration of the feedback loop and are selected from the L matrix as described below.

As will be understood more fully from the detailed description below, for L, Y and S calculations a filter length of W−1 is used, and for X and R calculations a filter length of W is used.

The $L_{ij}$ divisor is changed for the first W iterations from $L_{11}$ to $L_{ww}$. Once W iterations have been completed the $L_{jj}$ value is kept constant at $L_{ww}$ ($L_{44}$ in the example above).

It is to be noted that the algorithm described below assumes that the filter is implemented as the inverse filter structure. There is a similar algorithm for selecting the filter coefficients for a normal filter structure.

The coefficients for the filter are selected by columns from the L matrix, starting with the left hand column at the row below the diagonal. The diagonal is not used. W−1 coefficients must be selected. For rows >1 when the bottom of the L matrix is reached the remaining tap coefficients in the filter are kept the same as the previous iteration. Once W−1 iterations have been completed the filter coefficients are not changed.

For $y_1$:

This is simply given by $y_1 = x_1/l_{11}$.

For $y_2$:

The filter coefficients are given the reading the first column of the L matrix top to bottom ignoring the first diagonal element, $L_{21}, L_{31}, L_{41} \ldots L_{W1}$. The divisor is $l_{22}$.

This gives $$y_2 = (x_2 - y_1 l_{21})/l_{22}$$

For $y_3$:

The filter coefficients are given by reading the second column of the L matrix top to bottom ignoring the first diagonal element, $L_{32}, L_{42}, L_{52} \ldots L_{W2}, L_{W1}$ (it may be noted that the final coefficient is the last coefficient used in calculating $y_2$ as there are only W−1 rows in column 2 of the L matrix below the diagonal). The divisor is $l_{33}$. This gives $$y_3 = (x_3 - [y_1 l_{31} + y_2 l_{32}])/l_{33}$$

For $y_4$:

The filter coefficients are given by reading the third column of the L matrix top to bottom ignoring the first diagonal element, $L_{43}, L_{53}, L_{63} \ldots L_{W-2\ 3}, L_{W\ 2}, L_{W\ 1}$ (it may be noted that the last 2 coefficients are the last 2 coefficients used in calculating $y_3$ as there are only W−2 rows in column 3 of the L matrix below the diagonal). The divisor is $l_{44}$.

This gives $$y_4 = (x_4 - [y_1 l_{41} + y_2 l_{42} + y_3 l_{43}])/l_{44}$$

For j>W−1 the filter coefficients remain constant and $L_{ww}$ is used as the divisor.

S Back Substitution

Figure 8:
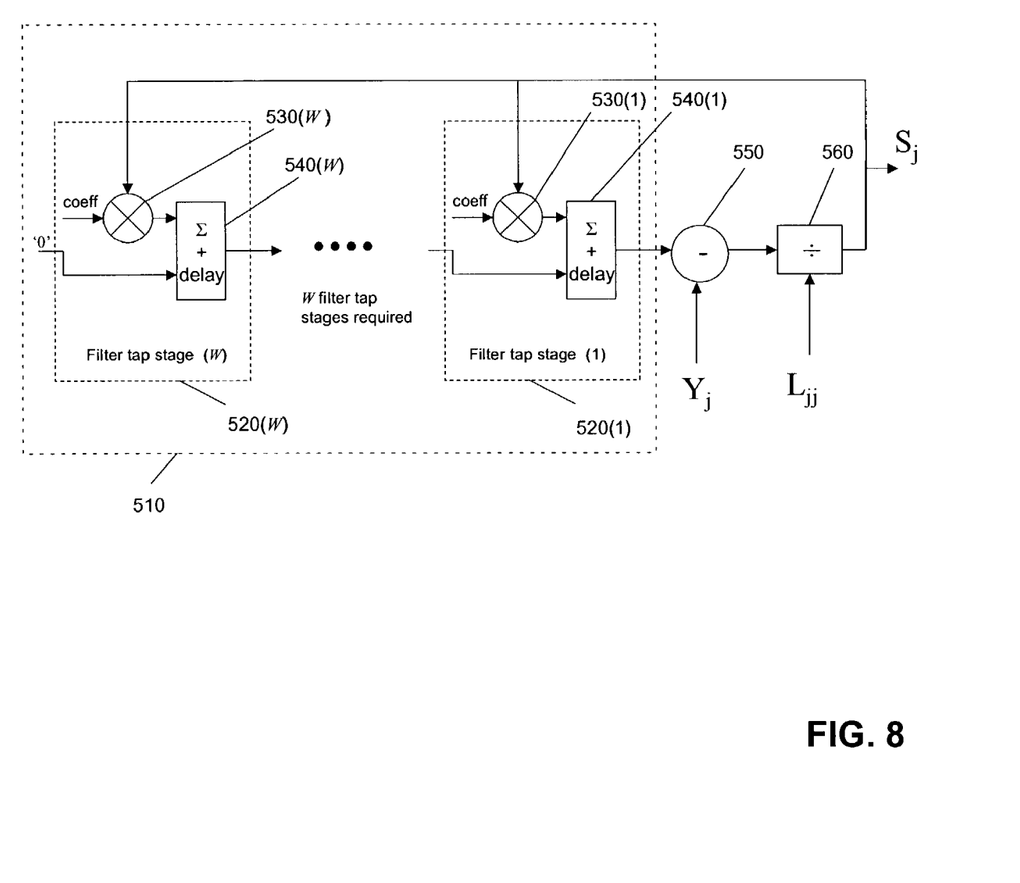
FIG. 8 shows a block-schematic diagram, similar to FIG. 7, illustrating the Inverse Filter structure of FIG. 5 as used for S value calculation.

As shown in the FIR configuration of FIG. 8, the S value calculation is similar to the Y value calculation, with the difference being the way that the filter coefficients are loaded and the way that the $L_{jj}$ divisor is selected; also, for S calculation the input to the subtractor 550 is Y rather than X.

It is to be noted that the s results are computed from $S_{NQ}$ to $S_1$. It is also to be noted that the algorithm described below assumes that the filter is implemented as the inverse filter structure. There is a similar algorithm for selecting the filter coefficients for a normal filter structure.

For the first NQ−W−1 iterations the Ljj value is set at $L_{ww}$.

The filter coefficients are $L^*_{w\ 1}, L^*_{w\ 2}, L^*_{w\ 3}, \ldots L^*_{w\ w-1}$ For $s_{w-1}$ the filter coefficients are not changed but the divisor used is $L_{w-1\ w-1}$.

For the last W−2 values of s the divisor is changed from $L_{w-2\ w-2}$ to $L_{11}$ The filter coefficients are changed for each iteration by selecting the L matrix values by moving up diagonally to the left through the L matrix for each filter tap. When the left hand column has been reached, the filter taps can be set to any value as they no longer contribute to the output (Denoted by '?' below).

For example

The L matrix for W=6 is shown below $$L = \begin{pmatrix} l_{11} & 0 & 0 & 0 & 0 & 0 \\ l_{21} & l_{22} & 0 & 0 & 0 & 0 \\ l_{31} & l_{32} & l_{33} & 0 & 0 & 0 \\ l_{41} & l_{42} & l_{43} & l_{44} & 0 & 0 \\ l_{51} & l_{52} & l_{53} & l_{54} & l_{55} & 0 \\ l_{61} & l_{62} & l_{63} & l_{64} & l_{65} & l_{66} \end{pmatrix}$$

The filter taps for the first NQ−W−1 values of s are $L^*_{6\ 1}, L^*_{62}, L^*_{63}, L^*_{64}, L^*_{65}$. The divisor is $L_{66}$. For $S_5$ the filter coefficients are not changed but the divisor used is $L_{55}$.

For $S_4$ the filter coefficients are $?, L^*_{5\ 1}, L^*_{52}, L^*_{53}, L^*_{54}$. The divisor used is $L_{44}$.

For $S_3$ the filter coefficients are $?, L^*_{41}, L^*_{42}, L^*_{43}$. The divisor used is $L_{33}$.

For $S_2$ the filter coefficients are $?, L^*_{31}, L^*_{32}$. The divisor used is $L_{22}$.

For $S_1$ the filter coefficients are $?, ?, ?, ?, L^*_{21}$. The divisor used is $L_{11}$.

It will be appreciated that although it is possible to remove the Cholesky decomposition value (L) from the above process, with some simplification, the L value calculation must then be performed separately, reducing the optimal quality of the process described above in allowing all the necessary values for single user detection to be performed by use of a single, re-configurable FIR scheme.

It will further be appreciated that the R, L, X, Y and S parameters may be derived in any order, provided that the values necessary for the certain calculations are available in advance of those calculations being performed, the requirements being as follows:

L calculation requires R,

Y calculation requires L, X and R, and

S calculation requires L, X, Y and R.

Figure 9:
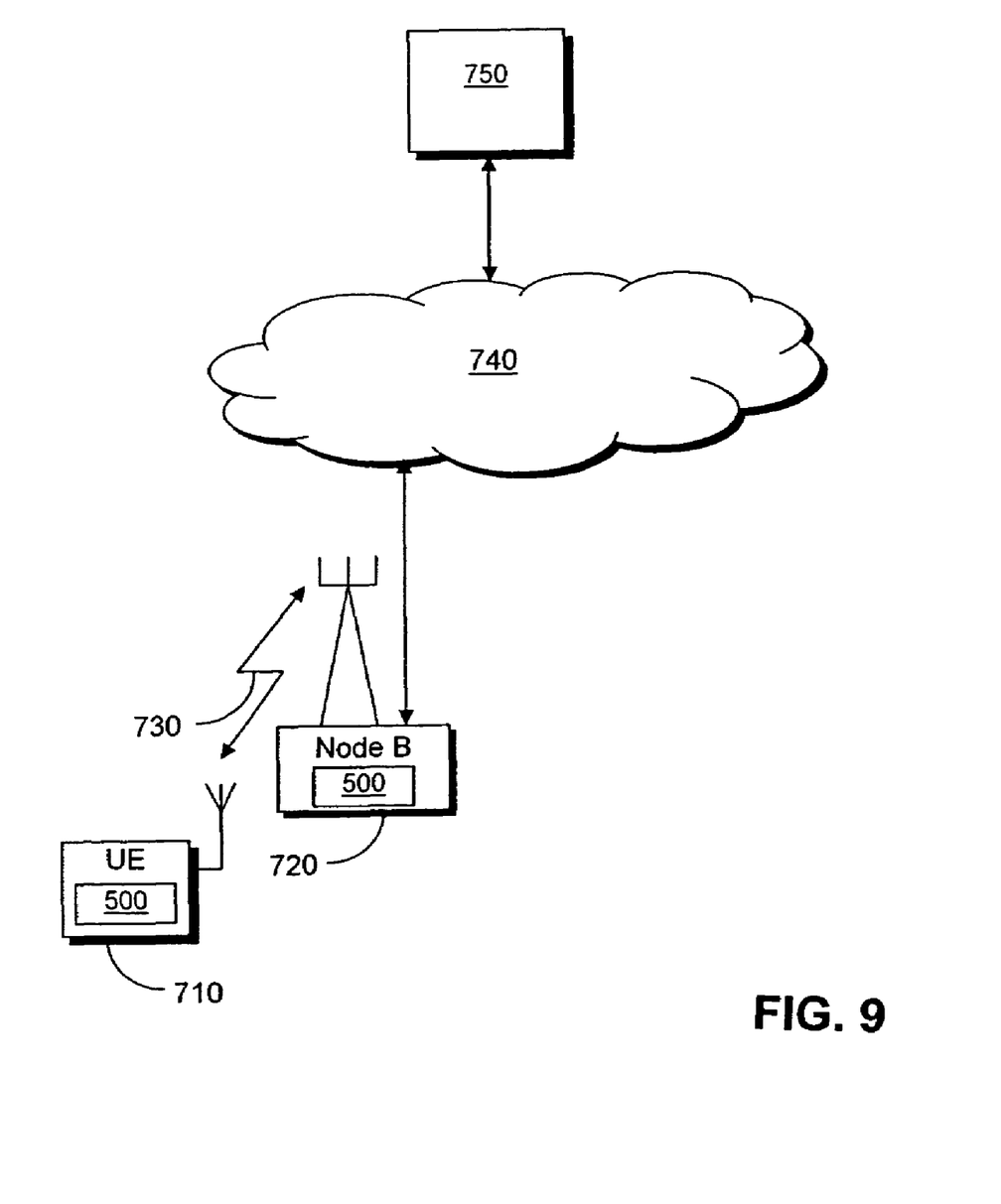
FIG. 9 shows a block-schematic diagram of a UMTS system in which the invention is used.

Referring now also to FIG. 9, a UMTS system 700 includes a user terminal 710 (commonly referred to as 'User Equipment') which communicates over a CDMA radio link with a base station 730 (commonly referred to as a 'Node B'). The Node B 730 is controlled by a radio network controller 740, which communicates with other system infrastructure shown collectively as 750. Such a system (insofar as it has been described up to this point) is well known and need not be described further. However, it will be understood that the single user detector 500 described above may be advantageously implemented in either a UE 710 or a Node B 730 of the system as shown in the figure.

It will be appreciated that the method described above for deriving the R, L, X, Y and S parameters for use in single user detection may be carried out in software running on a processor (not shown), and that the software may be provided as a computer program element carried on any suitable data carrier (also not shown) such as a magnetic or optical computer disc. It will also be appreciated that the method described above may alternatively be carried out in hardware such as an integrated circuit, e.g., a Field Programmable Gate Array (FPGA) or Application Specific Integrated Circuit (ASIC).

In conclusion, therefore, it will be understood that the method and arrangement described above for use in a single user detector for a CDMA multi-path system provides the advantages that the five parameters R, L, X, Y and S the steps required to implement the single user detector can be implemented using a single re-configurable FIR filter, simplifying the method and arrangement required to implement the single user detector.

The invention claimed is:

1. A method for utilizing a single configurable finite impulse response (FIR) filter for use in a single user detector in a code division multiple access (CDMA) multi-path system, comprising:

providing a single finite impulse response (FIR) filter;

configuring the FIR filter to derive at least a first, then a second, then a third, then a fourth of the following parameters for single user detection:

auto correlation function R,

X value representative of the complex conjugate of a channel impulse response multiplied and summed with time shifted versions of a received signal, back substitution value Y determined from a first set of linear equations, wherein the back substitution value Y is a function of the auto correlation function R, the X value, and a Cholesky decomposition value L, and back substitution value S determined from a second set of linear equations, wherein the back substitution value S is a function of the auto correlation function R, the X value, the back substitution value Y, and the L value; and using the auto correlation function R, the X value, the back substitution value Y, and the back substitution value S in the single user detector to recover single user data transmitted from a transmitter.

2. The method of claim 1, further comprising configuring the FIR filter to derive the Cholesky decomposition value L for single user detection.

3. The method of claim 1, wherein the step of configuring the FIR filter comprises configuring the filter coefficients and the connection paths of summation elements in a plurality of stages of the FIR filter.

4. The method of claim 3, wherein the step of configuring the connection paths of summation elements in a plurality at stages of the FIR filter comprises selecting connection paths from summation elements' outputs respectively to summation elements' input in adjacent stages.

5. The method of claim 4, further comprising configuring the FIR filter to derive a Cholesky decomposition value L for single user detection, and wherein the step of configuring the connection paths of summation elements in a plurality of stages of the FIR filter comprises selecting feedback paths between output and input of the summation element within each stage.

6. The method of claim 1 wherein the FIR filter is in user equipment for use in a universal mobile telecommunications system (UMTS) system.

7. The method of claim 1 wherein the FIR filter is in a base station for use in a universal mobile telecommunications system (UMTS) system.

8. An arrangement for utilizing a single configurable finite impulse response (FIR) filter for use in a single user detector in a code division multiple access (CDMA) multi-path system, comprising:

a single finite impulse response (FIR) filter;

means for configuring the FIR filter to derive at least a first, then a second, then a third, then a fourth of the following parameters for single user detection:

auto correlation function R,

X value representative of the complex conjugate of a channel impulse response multiplied and summed with time shifted versions of a received signal, back substitution value Y determined from a first set or linear equations, wherein the back substitution value Y is a function of the auto correlation function R, the X value, and a Cholesky decomposition value L, and back substitution value S determined from a second set of linear equations, wherein the back substitution value S is a function of the auto correlation function R, the X value, the back substitution value Y, and the L value; and means for using the auto correlation function R, the X value, the back substitution value Y, and the back substitution value S to recover single user data transmitted from a transmitter.

9. The arrangement of claim 8, further comprising means for configuring the FIR filter to derive the Cholesky decomposition value L for single user detection.

10. The arrangement of claim 8, wherein the means for configuring the FIR filter comprises means for configuring the filter coefficients and the connection paths of summation elements in a plurality of stages of the FIR filter.

11. The arrangement of claim 10, wherein the means for configuring the connection paths of summation elements in a plurality of stages of the FIR filter comprises means for selecting connection paths from summation elements' outputs respectively to summation elements' input in adjacent stages.

12. The arrangement of claim 11, further comprising means for configuring the FIR filter to derive a Cholesky decomposition value (L) for single user detection, and wherein the means for configuring the connection paths of summation elements in a plurality of stages of the FIR filter comprises means for selecting feedback paths between output and input of the summation element within each stage.

13. An integrated circuit comprising the arrangement of claim 8.

14. A single user detector for use in a CDMA multi-path system, the single user detector comprising the arrangement of claim 8.

15. User equipment for use in a universal mobile telecommunications system (UMTS) system, the user equipment comprising the arrangement of claim 8.

16. A base station for use in a universal mobile telecommunications system (UMTS) system, the base station comprising the arrangement of claim 8.

* * * * *

UNITED STATES PATENT AND TRADEMARK OFFICE
CERTIFICATE OF CORRECTION

PATENT NO. : 7,352,794 B2  Page 1 of 1
APPLICATION NO. : 10/262160
DATED : April 1, 2008
INVENTOR(S) : Steven N. Geers

It is certified that error appears in the above-identified patent and that said Letters Patent is hereby corrected as shown below:

Column 13, Claim 4, Line 20, delete "at" and insert --of--.

Column 14, Claim 8, Line 1, delete "or" and insert --of--.

Signed and Sealed this

Twenty-second Day of September, 2009

David J. Kappos
*Director of the United States Patent and Trademark Office*